Patented Sept. 2, 1952

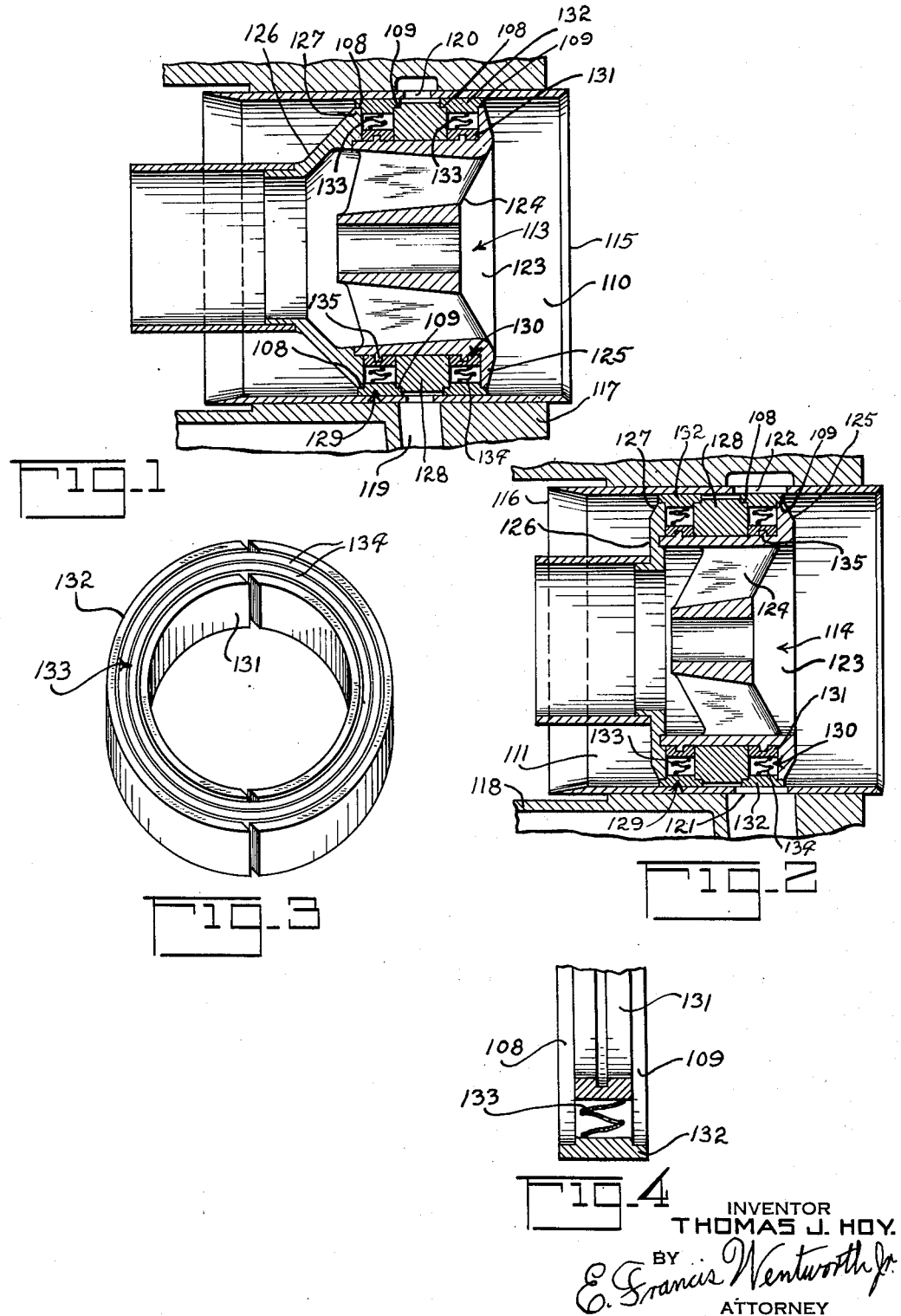

2,609,257

UNITED STATES PATENT OFFICE 2,609,257

PISTON RING

Thomas J. Hoy, Newark, N. J.

Original application January 8, 1945, Serial No. 571,745, now Patent No. 2,490,811, dated December 13, 1949. Divided and this application December 10, 1949, Serial No. 132,302

10 Claims. (Cl. 309—29)

The present invention relates to valves and piston rings therefor and more particularly to slide or piston valves of the type used for admission and exhaust valves for steam locomotives, reciprocating steam engines and the like.

This invention provides a slide or piston valve wherein leakage of steam past the rings is prevented thereby improving lubrication and greatly reducing sliding friction.

The present invention further provides a piston ring structure in which the ring is maintained in sliding contact with the surface with which it cooperates by a preloaded resilient force acting upon said ring.

This application is a division of application Serial No. 571,745 filed January 8, 1945 and which was issued on December 13, 1949 as United States Patent No. 2,490,811.

The invention will be understood from the following description when considered in connection with the accompanying drawing forming a part thereof, and in which:

Fig. 1 is a longitudinal sectional view of an admission piston valve embodying the present invention;

Fig. 2 is a view similar to Fig. 1 but of an exhaust piston valve;

Fig. 3 is a perspective view of the piston ring and holding means of the valves shown in Figs. 1 and 2, and Fig. 4 is an enlarged view of a portion of the valve illustrated in Fig. 3.

Like characters of reference refer to like parts throughout the several views.

Referring to the drawing, the present invention is illustrated as embodied in the admission and exhaust valves of a steam locomotive, reciprocating steam engine or the like. The admission valve 113 (Fig. 1) and exhaust valve 114 (Fig. 2) are slidably positioned respectively in valve chambers 110 and 111 which, as shown, comprise cylindrically shaped sleeves 115 and 116 secured in housings 117 and 118 respectively. The sleeve 115 has admission ports 119 and 120 therein through which steam is admitted to the sleeve 115 while sleeve 116 has exhaust ports 121 and 122 therein through which steam is exhausted from sleeve 116. The valves 113 and 114 comprise a tubular body portion 123 having a spider 124 therein. The body portion is flanged along one edge at 125 while at the other edge the body portion is secured to a member 126 having a flange 127. The flanges 125 and 127 form a groove in which a spacer 128 is positioned intermediate the flanges and spaced therefrom to form two spaces in which piston rings 129 and 130 are disposed.

The piston rings 129 and 130 comprise an inner ring 131 and an outer ring 132 of larger diameter than the inner ring and spaced therefrom. The rings 131 and 132 consist of two substantially semi-circular sections which sections are spaced from one another. The rings 131 and 132 are secured respectively to the inner periphery and the outer periphery of a bellows-like, pre-loaded diaphragm 133. The diaphragm 133 comprises a plurality of annular leaves 134 of flexible material superimposed in spaced relationship to one another, each leaf being connected adjacent opposite edges thereof to the leaf adjacent opposite sides thereof thereby to form a plurality of flexible hinges. The diaphragm 133 is preloaded so that it acts to hold the outer peripheral surface of ring 129 in tight engagement with the inner peripheral surface of body 123.

The inner ring 131 has an annular groove in the inner periphery which engages an annular projection 135 so as to position the piston ring in respect to the piston. The outer rings 132 each have a circumferential flange 108 around one side edge thereof and another circumferential flange 109 around the opposite side edge thereof.

In operation, the admission valve 113 is positioned within valve sleeve 115 and exhaust valve 114 is positioned within sleeve 116 each of said valves having piston rings 129 and 130 disposed thereon. The diaphragms 133 are of such diameter that they are compressed or preloaded when the valves, with the piston rings thereon, are inserted in their respective valve chambers. This is done by pressing the arcuate portions of the outer ring 132 toward one another which compresses the diaphragm 133 reducing the diameter of the piston rings so that the valves with which they are associated may be fitted into their respective chambers. When the valves are fitted in the admission and exhaust chambers the flanges 108 of the outer rings 132 of piston rings 129 and 130 respectively engage the outer peripheral surface of flanges 125 and 127 while the flanges 109 of said rings engage spacer 128. The preloaded diaphragms 133 at all times force the arcuate portions of the outer rings 132 apart and also force the outer periphery of outer rings 132 into fluid-tight engagement with the inner periphery of sleeves 115 and 116.

Wear on the outer peripheral surface of the rings 129 and 130 and the inner periphery of the valve chamber or sleeve caused by frictional engagement of said surfaces as the valves are reciprocated in their valve chambers is compensated for by diaphragms 133 which, since they are preloaded or compressed, hold the outer peripheral surface of ring 132 in fluid-tight engagement with the inner periphery of the valve chamber at all times, thusly preventing leaks. In this manner, a piston valve in which the sliding friction is greatly reduced is provided because the leakage of steam past the rings is prevented thereby resulting in improved lubrication and less sliding friction.

Since changes may be effected in the form of the invention selected for disclosure without departing from the principles of the invention, it will be understood that the invention is not to be limited excepting by the scope of the appended claims.

What is claimed is:

1. A piston ring comprising an inner ring, an outer ring, said rings being spaced from one another, and a compressible, circular, bellows-like diaphragm in the space between said rings and secured to said rings, the outer ring comprising at least two separate sections spaced apart, the diaphragm being adapted to force the inner and outer rings apart.

2. A piston ring comprising an inner ring, an outer ring, said rings being spaced from one another, and a compressible, circular, bellows-like diaphragm in the space between said rings and secured to said rings, the outer ring and the inner ring each comprising at least two separate sections spaced apart, the diaphragm being adapted to force the inner and outer rings apart.

3. A piston ring comprising an inner ring, an outer ring having a larger inside diameter than the outside diameter of the inner ring, said rings being disposed in concentric relationship to one another, and a compressible, circular, bellows-like diaphragm in the space between said rings and secured to said rings, the outer ring comprising at least two separate sections spaced apart, the diaphragm being adapted to force the inner and outer rings apart.

4. A piston ring comprising an inner ring, an outer ring having a larger inside diameter than the outside diameter of the inner ring, said rings being disposed in concentric relationship to one another, and a compressible, circular, bellows-like diaphragm in the space between said rings and secured to said rings, the outer ring comprising two semi-circular sections the adjacent ends of which sections are spaced apart, the diaphragm being adapted to force the inner and outer rings apart.

5. A piston ring comprising an inner ring, an outer ring having a larger inside diameter than the outside diameter of the inner ring, said rings being disposed in concentric relationship to one another, and a compressible, circular, bellows-like diaphragm in the space between said rings and secured to said rings, the inner ring and the outer ring each comprising two semi-circular sections the adjacent ends of which sections are spaced apart, the diaphragm being adapted to force the inner and outer rings apart.

6. A piston ring comprising an inner ring and an outer ring each having spaced arcuate sections, a preloaded diaphragm in the space between said rings, said diaphragm comprising a plurality of annular leaves of flexible material superimposed in spaced relationship to one another, each leaf being connected adjacent opposite edges thereof to the leaf adjacent the opposite sides thereof thereby to form a plurality of flexible hinges which normally urge the inner and outer rings apart.

7. A piston ring comprising an inner ring, an outer ring having a larger inside diameter than the outside diameter of the inner ring, said rings being disposed in concentric relationship to one another, and a compressible, circular, bellows-like diaphragm in the space between said rings and secured to said rings, said diaphragm comprising a plurality of annular leaves of flexible material superimposed in spaced relationship to one another, each leaf being connected adjacent opposite edges thereof to the leaf adjacent the opposite sides thereof thereby to form a plurality of flexible hinges which normally urge the inner and outer rings apart.

8. A piston ring comprising an inner ring, an outer ring having a larger inside diameter than the outside diameter of the inner ring, said rings being disposed in concentric relationship to one another, and a compressible, circular, bellows-like diaphragm in the space between said rings, the diaphragm being secured at its outer periphery to the inner periphery of the outer ring and at its inner periphery to the outer periphery of the inner ring, said diaphragm comprising a plurality of annular leaves of flexible material superimposed in spaced relationship to one another, each leaf being connected adjacent opposite edges thereof to the leaf adjacent the opposite sides thereof thereby to form a plurality of flexible hinges which normally urge the inner and outer rings apart, the outer ring comprising two semi-circular sections the adjacent ends of which sections are spaced apart.

9. A piston ring comprising an inner ring, an outer ring having a larger inside diameter than the outside diameter of the inner ring, said rings being disposed in concentric relationship to one another, and a compressible, circular, bellows-like diaphragm in the space between said rings, the diaphragm being secured at its outer periphery to the inner periphery of the outer ring and at its inner periphery to the outer periphery of the inner ring, said diaphragm comprising a plurality of annular leaves of flexible material superimposed in spaced relationship to one another, each leaf being connected adjacent opposite edges thereof to the leaf adjacent the opposite sides thereof thereby to form a plurality of flexible hinges which normally urge the inner and outer rings apart, the inner ring and the outer ring each comprising two semi-circular sections the adjacent ends of which sections are spaced apart.

10. A piston ring comprising an inner ring, an outer ring, said rings being spaced from one another, and a compressible, circular, bellows-like diaphragm in the space between said rings and secured to said rings, the diaphragm being so positioned that the bellows force the inner and outer rings apart.

THOMAS J. HOY.

REFERENCES CITED

The following references are of record in the file of this patent:

UNITED STATES PATENTS

| Number | Name | Date |
|---|---|---|
| 833,583 | Crawford | Oct. 16, 1906 |
| 1,809,712 | Kowarick | June 9, 1931 |
| 1,918,707 | Mellor | July 18, 1933 |
| 2,394,408 | Starr | Feb. 5, 1946 |